United States Patent [19]

Bloomfield

[11] 4,004,947
[45] Jan. 25, 1977

[54] PRESSURIZED FUEL CELL POWER PLANT
[75] Inventor: David P. Bloomfield, West Hartford, Conn.
[73] Assignee: United Technologies Corporation, Hartford, Conn.
[22] Filed: Feb. 12, 1975
[21] Appl. No.: 549,601
[52] U.S. Cl. .................................. 429/17; 429/19
[51] Int. Cl.² ...................................... H01M 8/06
[58] Field of Search ............ 136/86 A, 86 B, 86 C, 136/86 R

[56] References Cited
UNITED STATES PATENTS

| 668,838 | 2/1901 | Lavison | 136/86 A |
|---|---|---|---|
| 1,182,759 | 5/1916 | Emanuel | 136/86 R |
| 3,112,229 | 11/1963 | Bacon et al. | 136/86 R |
| 3,311,097 | 3/1967 | Mittelsleadt | 123/119 |
| 3,404,529 | 10/1968 | Lagerstrom | 60/6 |
| 3,507,702 | 7/1970 | Sanderson | 136/86 R |
| 3,615,850 | 10/1971 | Chludzinski | 136/86 C |

Primary Examiner—John H. Mack
Assistant Examiner—H. A. Feeley
Attorney, Agent, or Firm—Stephen E. Revis

[57] ABSTRACT

A fuel cell power plant for producing electricity uses pressurized reactants in the cells. In one embodiment air is the oxidant and is compressed in a compressor driven by a turbine. The turbine is powered by waste energy produced in the power plant in the form of a hot pressurized gaseous medium. For example, effluent gases from both the anode and cathode sides of the cells is delivered into the turbine which in turn drives the compressor. In a preferred embodiment the effluent gases from the anode side of the cells is first delivered into a burner for providing heat to a steam reforming reactor, and the effluent gases from the burner are delivered into the turbine. In another embodiment, in addition to effluent gases delivered from the anode side of the cells into the burner, a portion of the effluent gases from the anode side of the cells is also delivered into the steam reforming reactor to provide steam for the fuel processing.

30 Claims, 7 Drawing Figures

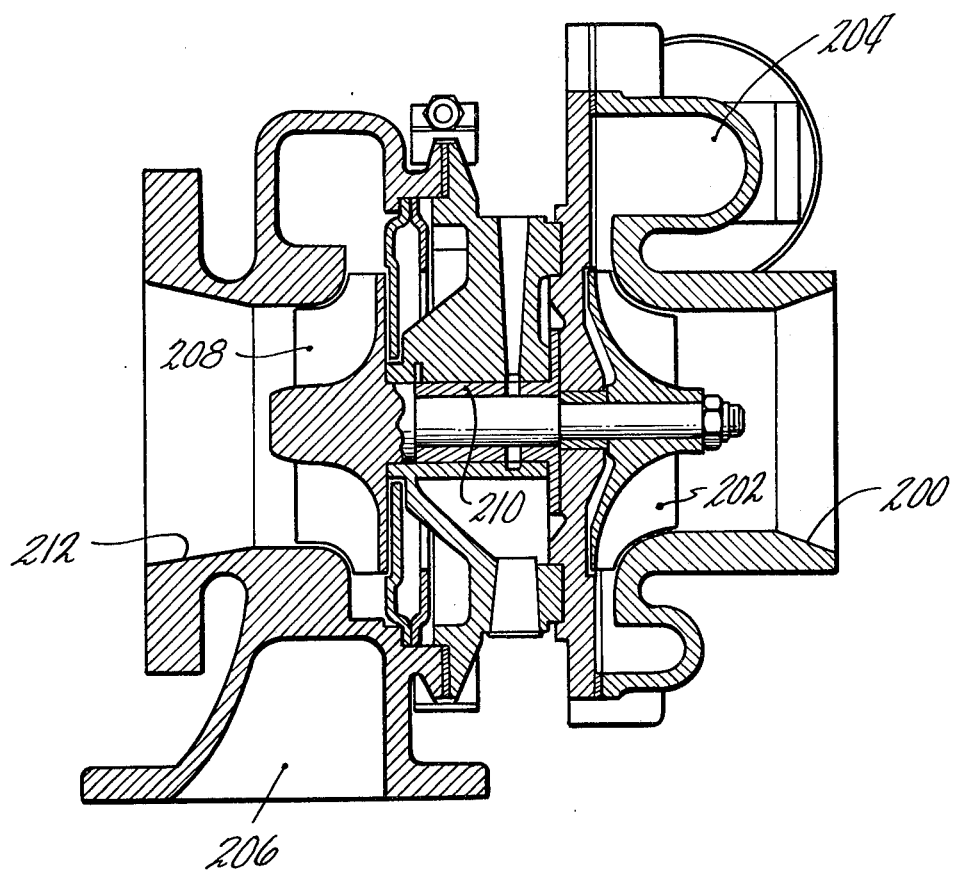
FIG_2

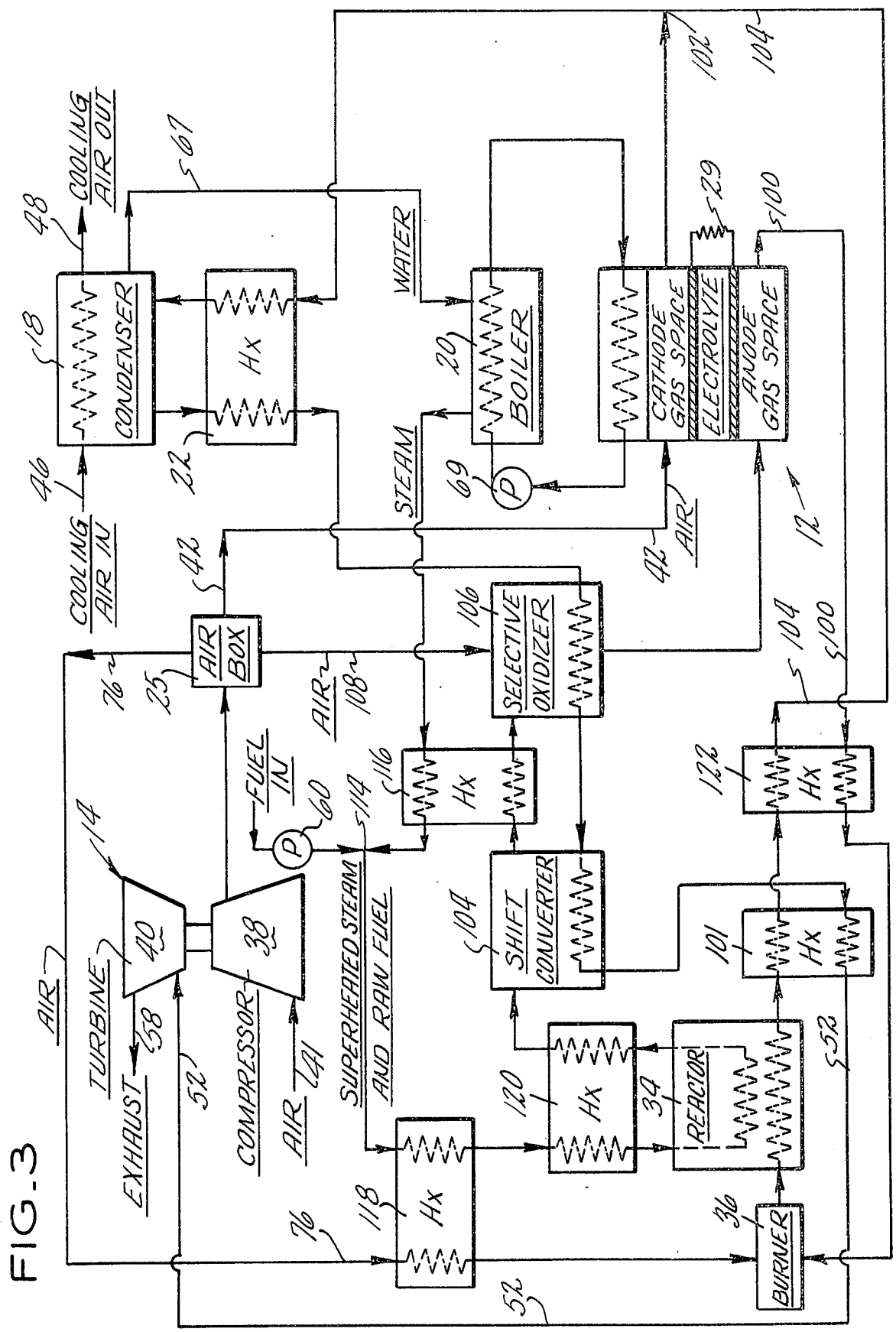

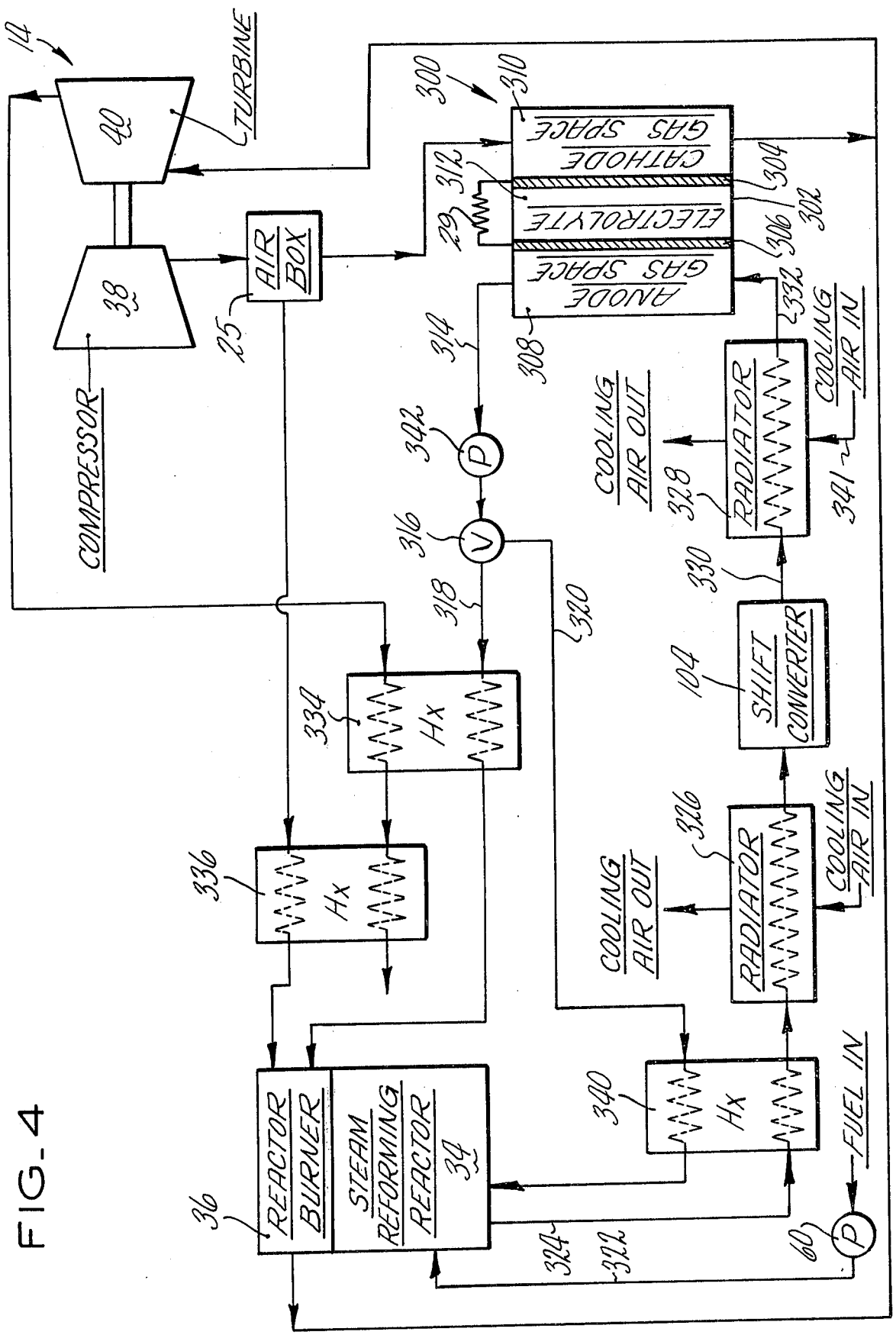
FIG_4

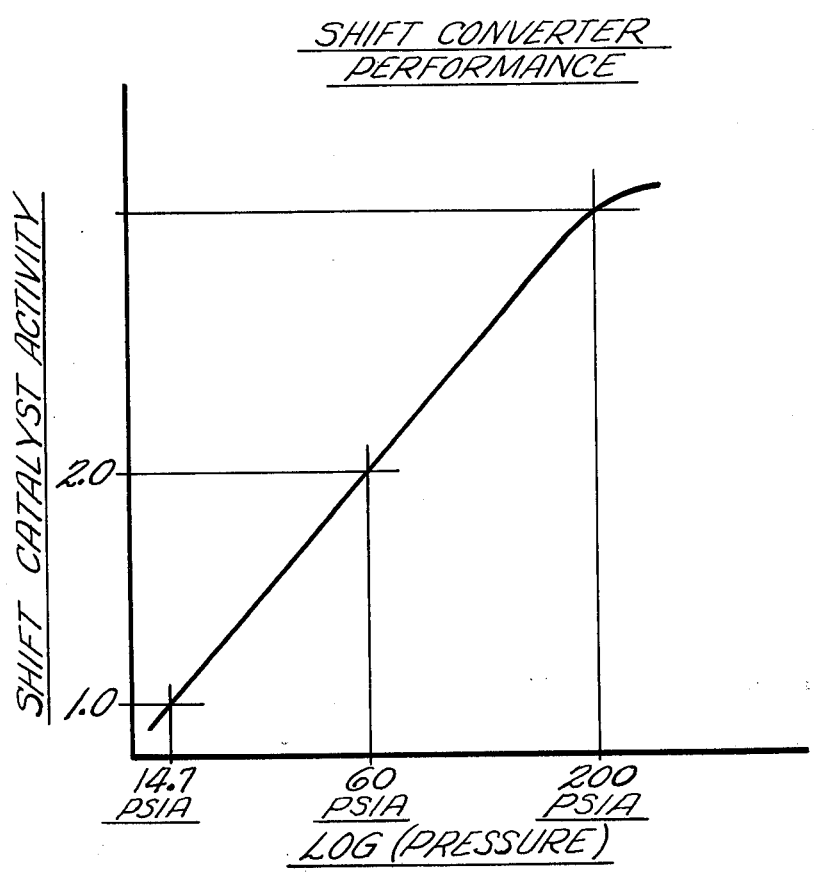
FIG_7

PRESSURIZED FUEL CELL POWER PLANT

BACKGROUND OF THE INVENTION

1. Field of the Invention

This invention relates to power plants and more particularly to electricity producing power plants utilizing fuel cells as the power source.

2. Description of the Prior Art

In the fuel cell art there have been three general approaches to improving fuel cell performance. One approach is to increase the temperature at which the fuel cell operates. This approach, however, is limited by material corrosion and, in acid electrolyte cells, by acid evaporation. A second approach is to attempt to increase the amount of catalyst per square inch of electrode surface area. This approach, however, is limited by the increased expense and practical limitations in the amount of catalyst that can possibly be put on a certain area of electrode. A third approach is to increase the pressure of the reactants within the fuel cell. It is well known in the art that fuel cells perform better as reactant pressures increase. One of the major stumbling blocks to this approach is that it requires considerable energy to pressurize the reactants. It has been considered, for example, that the energy to pressurize reactants should be the electrical energy produced by the fuel cell; that electrical energy would be used to drive a compressor. The problem is that it takes about 30% of the electrical output of the cell stack to drive a compressor to produce a reasonable reactant pressure. This means that the fuel cell would have to be increased in size by about 50% to make up for the loss of usable electrical power. Since a fuel cell stack is itself the most expensive component of a fuel cell power plant, the increase in performance is offset by the increased cost due to increased cell size. Because total electrical power output of the cell stack is increased, other components of the power plant will have to be increased proportionately such as the condensing apparatus and the fuel conditioning apparatus. This further increases size and cost of the power plant. Further, other apparent disadvantages in the power plant system utilizing high pressure reactants are the cost of additional equipment to pressurize the reactants, the necessity for more expensive sealing arrangements, and the additional cost due to the necessity of utilizing stronger components to contain the higher pressures. In view of the foregoing considerations, with regard to power plants utilizing air as the oxidant, it has always been considered that no net advantage could be achieved, and most likely, there would be a net disadvantage in going to power plants utilizing high pressure reactants in the fuel cell stack. For the foregoing reasons, up to the present time, these fuel cell power plants have always used reactants at atmospheric pressure.

RELATED APPLICATIONS

The following applications, filed on even date herewith and of common assignee, pertain to subject matter related to the present invention:

1. "Pressurized Fuel Cell Power Plant" by D. Bloomfield and R. Cohen, U.S. Ser. No. 549,600.
2. "Pressurized Fuel Cell Power Plant With Air Bypass" by M. Landau, U.S. Ser. No. 549,598.
3. "Pressurized Fuel Cell Power Plant With Steam Flow Through The Cells" by D. Bloomfield and M. Landau, U.S. Ser. No. 549,596.
4. "Pressurized Fuel Cell Power Plant" by M. Menard, U.S. Ser, No. 549,597.
5. "Pressurized Fuel Cell Power Plant with Single Reactant Gas Stream" by D. Bloomfield, U.S. Ser. No. 549,602.
6. The Pressurized Fuel Cell Power Plant With Steam Powered Compressor" by D. Bloomfield, U.S. Ser. No. 549,599.

SUMMARY OF THE INVENTION

One object of the present invention is an economically attractive fuel cell power plant that operates on pressurized reactants.

Another object of the present invention is a more efficient fuel cell power plant.

A further object of the present invention is a fuel cell power plant which, when compared to a prior art fuel cell power plant of similar capacity, is smaller in size, and has lower overall hardware costs.

Accordingly, the present invention is an electricity generating power plant using fuel cells wherein the oxidant is supplied to the fuel cells at high pressure from compressor apparatus which is driven by waste energy produced by the power plant in the form of hot pressurized gases. It one embodiment of the present invention both air and fuel are supplied to the cells at high pressure, and the energy in the cathode gas stream effluent, the anode gas stream effluent, and the steam reformer reactor burner effluent is used, at least in part, to drive a turbine which in turn runs a compressor for pressurizing the oxidant stream to the cathode.

Since the electrical energy output from the cell stack is not used to pressurize the air, there is no need to increase the size of the fuel cell stack in order to maintain power plant capacity. As a matter of fact, full advantage can be taken of the performance improvement in the fuel cell stack such that the stack may produce even more electrical energy without an increase in its size.

Furthermore, other heretofore unrecognized benefits arise throughout the power plant to further enhance the attractiveness of a fuel cell power plant designed according to the present invention. For example, one advantage of the present invention is that it permits a reduction in the size of the water recovery or condensing apparatus of the power plant by a factor of about two or three. This is particularly significant since the water recovery apparatus of prior art fuel cell power plants occupies a volume about as large as the fuel cell stack and fuel conditioning apparatus combined. In another embodiment of the present invention water recovery apparatus is eliminated.

Another advantage of the present invention is that it permits a reduction in the size of the steam reforming reactor (i.e., part of the fuel conditioning apparatus) of the power plant by a factor of about two as compared to the steam reforming reactor used in a prior art fuel cell power plant of similar capacity.

The foregoing and other objects, features and advantages of the present invention will be more fully explained and will become more apparent in the light of the following description of preferred embodiments thereof as illustrated in the accompanying drawing.

BRIEF DESCRIPTION OF THE DRAWING

FIG. 2 is a cross-sectional view of a turbocharger which may be used in power plants of the present invention.

FIGS. 3 and 4 are schematic representations of power plants according to alternate embodiments of the present invention.

FIG. 7 is a graph illustrating shift converter performance at various pressures.

DESCRIPTION OF THE PREFERRED EMBODIMENTS

Figure 1:
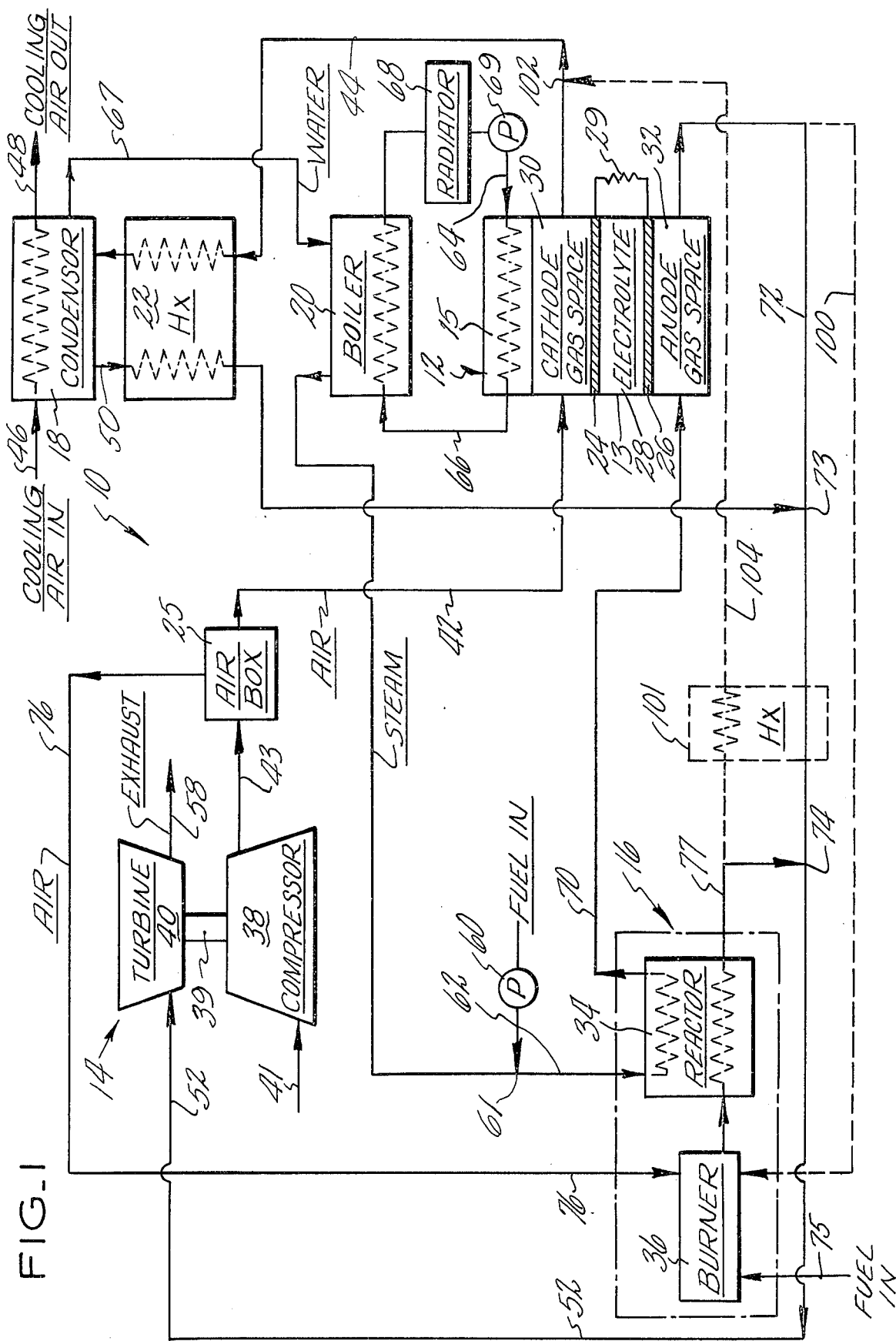
FIG. 1 is a schematic representation of a power plant according to the present invention.

Consider, as an exemplary embodiment of the present invention, the power plant depicted schematically in FIG. 1. The power plant is generally designated by the numeral 10 and includes a fuel cell stack generally designated by the numeral 12, compressor apparatus generally designated by the numeral 14, fuel conditioning apparatus generally designated by the numeral 16, a condenser 18, a boiler 20, a regenerator 22, and an air flow splitter or air control box 25. The fuel cell stack 12 may comprise any conventional type of fuel cells which operate on gaseous reactants. In this embodiment the oxidant is air and the fuel is hydrogen. The stack 12 will generally comprise a plurality of fuel cells connected in series electrically through a load, but is herein depicted as only comprising a single cell 13 for the purpose of clarity and a thermal management portion 15. As herein shown each cell includes a cathode electrode 24 spaced from an anode electrode 26 and including an electrolyte retaining matrix 28 therebetween. In this preferred embodiment the electrolyte is liquid phosphoric acid but the invention is not intended to be limited thereto and both acid and base electrolytes as well as solid types of electrolytes such as metal oxide electrolytes or solid polymer electrolytes are contemplated as being useful in a power plant designed according to the present invention. The electrodes 24, 26 are connected in series through a load 29. Each cell 13 also includes a cathode gas space 30 on the nonelectrolyte side of the cathode electrode 24 and an anode gas space 32 on the nonelectrolyte side of the anode electrode 26. In this embodiment the fuel conditioning apparatus 16 comprises a steam reforming reactor 34 and a reactor burner 36. The compressor apparatus 14 is a turbocharger comprising a compressor 38 driven by an exhaust turbine 40 through a shaft 39, and will be described hereinafter in more detail as will other components of the power plant 10.

Still referring to FIG. 1, in operation air enters the compressor 38 via a conduit 41 and is compressed. Any pressure greater than atmospheric pressure will yield some benefits as compared to unpressurized power plants; however, about two or higher atmospheres of pressure are desirable in order that substantial benefits are realized for the total power plant. This pressurized air enters the air box 25 via a conduit 43. The air box includes controls and valves for properly proportioning the air flow to various components. A portion is directed into the cathode gas space 30 via a conduit 42 and is electrochemically reacted within the cathode electrode 24 with the phosphoric acid electrolyte in the matrix 28 to produce electricity and water, some of the water being evaporated back into the air stream flowing through the cathode gas space 30. The moist, hot, cathode effluent leaves the gas space 30 via a conduit 44 and passes through the regenerator 22 and thence through the condenser 18. Cooling air enters the condenser 18 via a conduit 46 and leaves in a heated condition via a conduit 48. Within the condenser 18 the cathode effluent is cooled to the point where water condenses out and is collected for use in the fuel conditioning apparatus 16 as will be hereinafter discussed. The relatively cool cathode effluent leaves the condenser via a conduit 50 and passes back through the regenerator 22 where it recovers some of its lost heat. The reheated cathode effluent leaves the regenerator 22, is combined with the anode effluent gas stream and the reactor burner effluent gas stream. It then passes into the turbine 40 via a conduit 52, and provides energy to power the turbine 40 which in turn drives the compressor 38. If necessary, an auxiliary burner (not shown) with its own fuel supply may be utilized to further boost the energy of the combined gas streams before they enter the turbine 40. After passing through the turbine 40 any further energy in the gas stream may be either thrown away via a conduit 58 or may be used elsewhere in the power plant.

On the anode side, a hydrogen containing liquid fuel such as naphtha, which has been increased in pressure by a pump 60 to about the same pressure as the air entering the cathode gas space 30, is mixed with steam at 61 from the boiler 20 and enters the steam reforming reactor 34 via a conduit 62. Although not shown, it is preferable that the fuel be atomized as it is combined with the steam at 61 so that the stream entering the reactor 34 is in the vapor state.

The boiler 20 may be provided with its own burner and fuel supply if desired, but as herein shown in this preferred embodiment the boiler 20 is run on waste heat produced by the stack 12. As shown, a coolant, such as a silicone oil, enters the thermal management portion 15 of the stack 12 via a conduit 64, picks up heat generated by the stack 12 and leaves via a conduit 66. Water from the condenser 18 is introduced into the boiler 20 via a conduit 67. The coolant fluid enters the boiler 20 and gives up its heat to the water in the boiler to produce steam. The coolant fluid leaves the boiler 20 and enters a radiator 68 where additional heat may be rejected before the coolant is pumped back to the stack 12 by a pump 69.

Processed fuel in the form of hydrogen gas and possibly some impurities leaves the steam reformer reactor 34 by means of a conduit 70 whereupon it enters the anode gas space 32 of the fuel cell 13 where it electrochemically reacts with the electrolyte. In this embodiment the anode gas stream is contemplated as being at about the same pressure as the cathode gas stream in order to minimize the risk of gas crossover between the anode and cathode gas spaces. The anode effluent gas stream leaves the anode gas space 32 by means of a conduit 72 and is combined with the cathode gas stream effluent at 73 and the burner effluent at 74, whereupon the mixture enters the turbine 40 and drives the compressor 38 as hereinbefore stated.

In this embodiment the steam reformer reactor burner 36 has its own fuel supply which is fed into the burner 36 via a conduit 75 and is combined with compressed air from the air box 25 which enters the burner via a conduit 76. The air and fuel burn in the burner 36 and provide the heat for the reactor 34. The burner gas stream effluent is thereupon combined, via a conduit 77, at 74, with the anode and cathode gas stream effluents.

An important feature of this invention, as illustrated in the foregoing embodiment, is that the heat in both the cathode gas stream effluent and the anode gas stream effluent is not wasted, but is instead used to power the turbine for compressing the oxidant. Further, the heat from the burner 36 which is not used in the reactor and which would otherwise be waste heat is also completely utilized by combining the burner effluent with the anode and cathode gas stream effluents.

Although in this embodiment the water for the reactor 34 is supplied by condensing out water from the cathode effluent gas stream, it may be that the power plant is situated near a supply of water such as a river, lake or large water tank. If that is the case then it would be possible to eliminate the condensing apparatus and to supply the reactor with water from these other sources. This would also eliminate the need for the regenerator 22.

As an example of a turbocharger suitable for use in a power plant designed according to the present invention, consider the turbocharger shown in FIG. 2. Ambient air enters a compressor duct 200 and impinges upon a single stage centrifugal impeller 202 which imparts a velocity heat to the air. The high velocity air flows into a diffuser 204 where the velocity head is changed to a pressure head. In the embodiment of FIG. 1 the compressed air would leave the diffuser 204 via a conduit 43 and, after passing through the air box 25, would be introduced into the cathode gas space 30 and the reactor burner 36. On the other side, hot gases enter a turbine inlet 206 (such as from the conduit 52 in FIG. 1) and flow through a centrifugal turbine rotor 208 which converts the thermal energy of the gas stream to shaft horsepower to drive a shaft 210 connected to the compressor impeller 202. The gases are exhausted via a turbine outlet duct 212.

The turbocharger pictured in FIG. 2 is only illustrative of the type of device preferred for use in the power plants of the present invention. Any commercially available turbocharger of a size sufficient to provide the required flow rate and pressure needed by the fuel cell stack chosen for use in the power plant may be used. For example, for a 1200 kilowatt power plant wherein it is desired that the reactant gases to the fuel cell stack are to be at about 3.5 atmospheres pressure, a Brown Boveri model RR150 turbocharger would be suitable. This particular model has the capability of providing a mass flow rate of up to 3.0 lb/sec at 50 psia. Although the term "turbocharger" is usually associated with a centrifugal compressor, as used herein it is intended to encompass an axial flow compressor as well. Centrifugal compressors are preferred because they have the advantage of high efficiency and high single-stage compression ratios not usually available with axial flow compressors. Also, although the turbocharger of FIG. 2 shows a centrifugal turbine, it is also contemplated that turbochargers using axial flow turbines may be used in power plants of the present invention.

Although what is pictured in FIG. 2 is representative of what is typically referred to in the art as a turbocharger the present invention is not intended to be limited thereto but may be any apparatus which uses the energy of a hot pressurized gaseous medium (typically exhaust gases) to compress another gas. For example, any heat engine capable of driving a compressor and which itself may be powered by a hot pressurized gas stream may be used. Also, a Comprex (registered trademark of Brown Boveri & Company, Ltd., Bade, Switzerland) supercharger which compresses air by direct transmission of energy from an expanding gas utilizing compression and expansion waves, or other device which works on similar principles, may be used. The Comprex supercharging concept is well known in the art and is more fully described in an ASME paper No. 58 titled "The Comprex . . . A New Concept of Diesel Supercharging" by Max Berchtold and F. J. Gardiner published in March 1958.

Another feature of this embodiment is that the pressures in the anode and cathode gas spaces 30, 32 are more easily kept equivalent in view of the fact that these streams are joined at 73, and must, of course, have the same pressure at 73. The pressure regulators usually required for this purpose may be eliminated.

A modified version of the heretofore described embodiment of FIG. 1 is illustrated by the dashed conduit lines in FIG. 1. In this alternate embodiment the effluent from the anode gas space 32 is fed to the burner 36 via a conduit 100 rather than being directly combined with the cathode gas stream effluent via conduit 72 at 73. The anode gas stream effluent contains enough unburned hydrogen gas such that there is no need for the burner 36 to be supplied with fuel via the conduit 75. The burner 36 provides the heat for the reactor 34. The burner effluent, which in this embodiment includes the anode gas stream effluent, passes through a heat exchanger or regenerator 101 and is thereupon combined with the cathode gas stream effluent at 102 via a conduit 104, rather than being combined at 74. By this arrangement water is removed from both the cathode gas stream effluent and anode gas stream effluent in the condenser 18 which is advantageous since the cathode gas stream alone may not be able to provide a sufficient amount of water for the reactor 34. The combined streams leave the condenser 18, recover some lost heat in the regenerator 22 and thereupon passed through the regenerator 101, increasing further in temperature by picking up heat from the combined burner/anode gas stream effluent. The hot gas stream then enters the turbine 40 which drives the compressor 38. The function of the heat exchanger 101 will be more fully explained hereinafter when the operation of the condenser 18 is explained in more detail.

FIG. 3 shows yet another embodiment of the present invention. Numerals similar to those of FIG. 1 represent elements the same as those in FIG. 1. This embodiment is similar in operation to the modified version or alternate embodiment of FIG. 1, but is somewhat more complex in view of the addition of a shift converter 104 and a selective oxidizer 106 to the fuel conditioning apparatus 16 (see FIG. 1). Also, four additional heat exchangers and a fuel boiler have been added to the power plant. The shift converter 104 reduces the carbon monoxide content of the gas stream leaving the reactor 34. In the shift converter carbon monoxide plus water combine in the presence of a catalyst to form hydrogen and carbon dioxide plus heat according to the well known equation as follows:

$$CO + H_2O \rightarrow H_2 + CO_2 + \text{heat} \qquad 1.$$

In the selective oxidizer most of any remaining carbon monoxide is reacted with oxygen in the presence of a catalyst to produce additional carbon dioxide plus heat according to the following equation:

$$CO + \tfrac{1}{2} O_2 \rightarrow CO_2 + \text{heat} \qquad 2.$$

The oxygen for the selective oxidation process is provided in the form of compressed air via the conduit 108 from the air box 25. The combined anode and cathode gas streams leaving the condenser 18 are in this embodiment passed through heat exchangers within both the selective oxidizer and the shift converter to pick up additional heat produced by these components which might otherwise be wasted.

Although the fuel conditioning apparatus of this embodiment is shown comprising a steam reforming reactor, reactor burner, shift converter, and selective oxidizer, the fuel conditioning apparatus of power plants designed according to the present invention may include other components. The requirements of the fuel conditioning apparatus are dependent in part upon the type of raw fuel being used and upon the particular design of the cells in the fuel cell stack. Indeed, the fuel conditioning apparatus may include a partial oxidation hydrogen generator instead of a steam reforming reactor and reactor burner.

In this embodiment waste energy from the fuel conditioning apparatus is delivered to the turbine 46 by passing the reactor burner effluent gases into the turbine. If the power plant had no steam reforming reactor and thus no reactor burner, other means would have to be provided for delivering waste energy from the fuel conditioning apparatus into the turbine, such as by a heat exchanger in operable relationship with the fuel conditioning apparatus and with any other gas stream being delivered into the turbine.

In the embodiments of FIG. 1 the steam leaves the boiler and passes directly into the reactor 34 after receiving fuel from the conduit 62. In the embodiment of FIG. 3 steam passes through three heat exchangers prior to entering the reactor 34. It first passes through a heat exchanger 116 where it is superheated by heat from the gas stream leaving the shift converter 104. It then picks up the raw fuel at 114 and additional heat in a heat exchanger 118 from compressed air (heat of compression) which flows through the heat exchanger 118 via the conduit 76. The fuel and superheated steam then pass through another heat exchanger 120 whereupon the temperature of the gas stream is increased to a temperature suitable for the steam reformer reaction in the reactor 34, which is about 1000° F. After passing through the reactor 34 the partially processed fuel passes back through the heat exchanger 120 where much of its heat is returned.

The only other feature of this embodiment which differs from the alternate embodiment described in FIG. 1 is the heat exchanger 122. The anode gas stream effluent passes through the heat exchanger 122 via the conduit 100 and is heated therein prior to its being introduced into the burner 36. The burner 36 provides the heat for the steam reforming reaction in the reactor 34; and the burner exhaust products, which include the anode gas stream effluent, are reduced in temperature before reaching the condenser 18 by passing them through heat exchanges 101 and 122 to minimize the work required of the condenser 18 as is hereinafter discussed.

A third embodiment of the present invention is shown in the schematic diagram of FIG. 4. Elements which are the same as the elements of the earlier described embodiments have been given the same reference numerals. The fuel cell stack has been given a new reference numeral 300 since it does not include a thermal management portion as in the other embodiments for reasons which will hereinafter be explained. The cell itself is now designated with the numeral 302 and comprises a cathode electrode 304, an anode electrode 306, an anode gas space 308, a cathode gas space 310, and an electrolyte 312.

Note that this embodiment is similar to the embodiment described with respect to FIG. 3 in that effluent gases from the anode gas space 308 are delivered into the reactor burner 36 along with air from the compressor 38. Also, the effluent gases from the reactor burner 36 are combined with the effluent gases from the cathode gas space and are thereupon delivered into the turbine 40 for driving the compressor 38.

Another important distinction between this embodiment and the other embodiments of the present invention is that steam for the steam reforming reactor is obtained directly from the anode gas space effluent gases without the need for water recovery apparatus. Thus, referring to FIG. 4, effluent gases including steam (i.e., water) produced in the cells leave the anode gas space via a conduit 314 and thereupon pass through valve means 316. The valve means 316 directs a portion of the gases into the reactor burner 36 via a conduit 318 and a portion of the gases into the steam reforming reactor 34 via a conduit 320. This latter portion, which includes steam, is mixed in the reactor 34 with pressurized unprocessed fuel delivered to the reactor 34 via a conduit 322. Partially processed fuel leaves the steam reforming reactor 34 via a conduit 324, is reduced in temperature in a radiator 326, and passes into a shift converter 104 for further processing. Processed fuel leaves the shift converter 104 and is delivered into another radiator 328 via a conduit 330 for further reducing the temperature of the gases before they are delivered into the anode gas space via a conduit 332.

Also shown in this embodiment are heat exchangers 334, 336 for transferring heat from the turbine exhaust gas stream to the reactor burner inlet fuel gas stream and the compressed air stream, respectively, entering the reactor burner 36. Another heat exchanger 340 is for heating the gas stream entering the reactor 34. It should be realized that the use of and placement of heat exchangers may vary from power plant to power plant as dictated by the particular components used in the power plant and the arrangement and requirements thereof. The arrangement of heat exchanges shown in FIG. 4 is not intended to limit the scope of the present invention but is shown by way of example only.

In addition to providing steam for the reactor 34, the recycled anode gas stream effluent is used to cool the stack 300. This is accomplished by reducing the temperature of the gas stream entering the anode gas space 308 to a level which is substantially below the desired temperature at which the stack is to be maintained. The final reduction in gas temperature is accomplished in the radiator 328, and is controlled by regulating the amount of cooling air passing into the radiator via a conduit 341. A pump 342 insures a sufficient flow of cooling gases through the anode gas space. The temperature of the gas stream is also reduced by means of the heat exchanger 340 and the radiator 326. The radiator 326 reduces the temperature of the gases entering the shift converter 104, which in this embodiment is a low temperature shift converter. The shift conversion reaction is exothermic and therefore increases the temperature of the gas stream as it passes therethrough which necessitates the use of the second radiator 328. A purpose of the heat exchanger 340, in addition to reducing the temperature of the gas stream leaving the reactor 34, is to heat the temperature of the gases entering the reactor 34 as has already been stated. Actually, any combination of heat exchangers for raising the temperature of the gases entering the reactor and for reducing the temperature of the gases leaving the reactor would be sufficient as long as a substantial portion of the heat in the reactor effluent is not thrown away.

As hereinabove stated it is necessary that sufficient steam be carried into the reactor 34 in the effluent gases from the anode gas space. To insure sufficient steam the mass flow rate through the anode gas space is maintained by the pump 342. The required flow rate through the anode gas space and the required split between the reactor burner and the reactor itself, as controlled by the valve 316, is determined by the pressure of the gases, the required reactor efficiency, and the amount of fuel required in the reactor burner in order to produce sufficient heat to drive the steam reforming reaction at the desired efficiency level.

In the embodiment of the present invention shown in FIGS. 1 and 3 the steam supplied to the reactor 34 is generated in a boiler disposed in the stack coolant loop. The pressure of the gases entering the anode gas space is limited by the pressure of the steam, which is, of course, mixed with the fuel. The pressure of the steam generated in the boiler is dependent upon the temperature of the coolant within the coolant loop, which is in turn limited by the stack temperature. If, for example, the temperature of a phosphoric acid cell is limited by corrosion problems the steam pressure is limited accordingly. The embodiment of FIG. 4 does not have this pressure limitation even though the cell may use phosphoric acid electrolyte. This is because the steam is evaporated into the anode gas space, 308, irrespective of the total pressure in that gas space, rather than being produced in a boiler driven by stack waste heat. Continuity requires removal of water from the cell. The water must constitute a certain mol fraction in the gas streams exiting from the cell stack. Since the steam pressure is simply the total pressure multiplied by the mol fraction of water, if total pressure is increased, continuity demands that steam pressure increase. At a given stack temperature, the electrolyte will become more dilute as total pressure is increased for precisely this reason, and the vapor pressure of water above the electrolyte is increased. Thus, much higher reactant gas pressures may, if desired, be used, which is an advantage of this embodiment.

Figure 5:
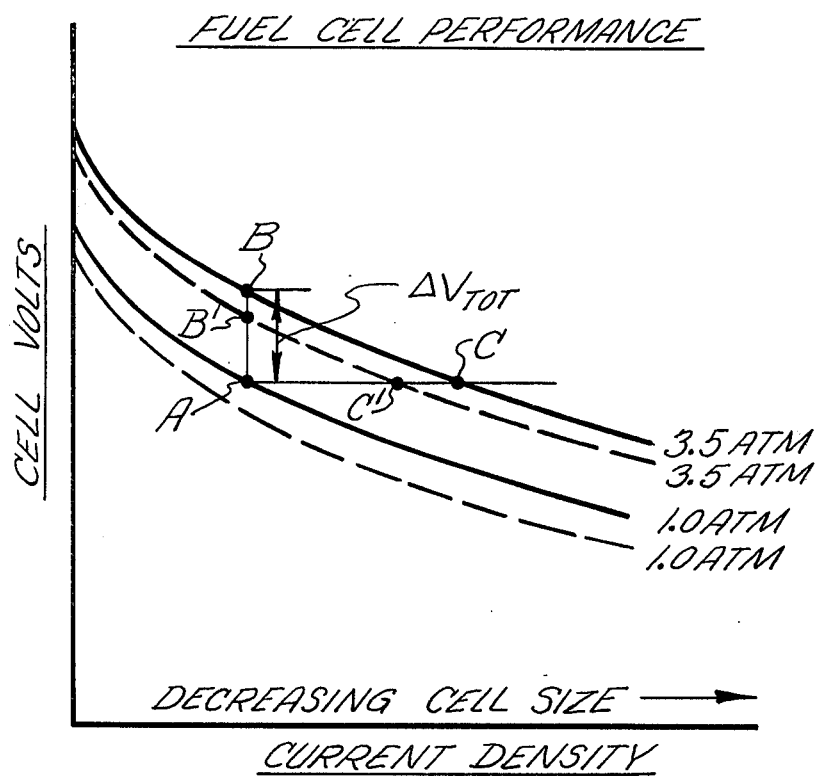
FIG. 5 is a graph illustrating the performance of fuel cells used in power plants of the present invention.

In order to more fully appreciate and understand the advantages and operation of the present invention, consider the graph of FIG. 5 which may be used to compare the performance of a fuel cell using reactants at atmospheric pressure to the performance of the same fuel cell using, for example, reactants at about 3.5 atmospheres of total pressure. There are several variables which must be taken into consideration when making comparisons between cells. Reactant utilization is the weight flow rate of reactants at either the anode or the cathode which is consumed in the cell by the electrochemical reaction divided by the weight flow rate of hydrogen or oxygen, respectively, into the cell. In a fuel cell operating on oxygen and hydrogen there is thus oxygen utilization ($U_{O_2}$) at the cathode and hydrogen utilization ($U_{H_2}$) at the anode. Raising reactant utilization automatically lowers the partial pressure of the reactants seen by the anode and the cathode since more reactants are taken out of the gas stream per pound of mass flow through the cell; thus, the average amount of reactant in the gas stream over the surface of the electrode is less from the inlet to the outlet. The curve labeled 1.0 atmosphere in FIG. 5 represents cell performance at a particular hydrogen utilization and oxygen utilization. The solid curve labeled 3.5 atmospheres represents cell performance at the same reactant utilization ratio. Also, the cells represented by each of these curves is assumed to be operating at the same temperature. The well known Tafel equation states that there will be an increase in cathode performance (i.e., an increase in voltage) when the partial pressure of oxygen increases. This equation is set forth below.

$$\Delta V_{cathode} = K(mv) \log \left[ \frac{P_{O_2}}{P_{O_2(ref)}} \right] \qquad (3)$$

where K is a constant. The Nernst equation states that there will be an increase in anode performance (i.e., an increase in cell voltage) when the partial pressure of hydrogen is increased. The Nernst equation is set forth below.

$$\Delta V_{anode} = C(mv) \ln \left[ \frac{P_{H_2}}{P_{H_2(ref)}} \right] \qquad (4)$$

where C is a constant. It is apparent that for constant temperature and for constant utilization, an increase in the total pressure of the reactants results in an increase in the partial pressure of both reactants leading to an improvement in both cathode and anode performance. The total improvement in fuel cell performance may be simply stated as follows:

$$\Delta V_{total} = \Delta V_{cathode} + \Delta V_{anode} \qquad (5.$$

The left hand side of equation (5) is illustrated by the graph of FIG. 5 as the difference in voltage between points A and B at constant current density. Further, from the graph of FIG. 5, it can be seen that by operating at reactant pressures of 3.5 atmospheres the cell size may be decreased without decreasing the cell voltage output such as by operating at point C.

The dotted curves on the graph of FIG. 5 are also representative of cell performance at 1.0 and 3.5 atmospheres of reactant pressure, respectively, as labeled. These curves represent the performance of cells similar in all respects to cells represented by the solid curves except that the cells have been designed for higher reactant utilization. Note that at 3.5 atmospheres the cell can run at a higher reactant utilization and still show improvement over the prior art such as an increase in cell voltage by operating at point B' or an increase in current density (i.e., a decrease in cell size) for the same cell voltage by operating at point C'. On the other hand, notice that for a cell using reactants at atmosphere pressure an increase in utilization means either increasing the size of the cell to maintain the same cell voltage or taking a voltage loss in order to maintain the same cell size. The importance of the ability to operate at higher hydrogen utilization without sacrificing performance or increasing the size of the cell will become apparent in the hereinafter set forth discussion relating to the operation of the steam reformer reactor 34 of the power plant of the preferred embodiment.

With regard to improvement in fuel cell performance the arrangement of the present invention according to FIG. 4 deserves special mention. In that power plant there is a certain amount of carbon dioxide recirculation through the anode gas space. This results in a partial pressure of hydrogen entering the anode gas space that is somewhat lower than in the other embodiments due to the higher level of carbon dioxide in the gas stream. According to the Nernst equation (3) this tends to lower fuel cell performance. However, the improvement in cell performance at the cathode and the other improvements and advantages of this embodiment hereinbefore and hereinafter discussed, such as the elimination of water recovery apparatus, still makes this power plant attractive for certain applications. Also, because this particular embodiment of the invention is not pressure limited by the stack temperature higher reactant pressures may be used so that the partial pressure of hydrogen entering the anode gas space is higher than (rather than lower than) in the other embodiments, thereby making it even more attractive in those circumstances.

In prior art phosphoric acid electrolyte fuel cells operating over 300° F and at atmospheric pressures evaporation of the phosphoric acid electrolyte occurs. The effect of acid evaporation is to require that acid be added regularly during the lifetime of the power plant. Acid evaporation is a function of the mass flow rate of air through the cathode gas space, the partial pressure of acid, and the total gas pressure in the cathode gas space according to the following relationship:

$$\text{Acid loss} = f\left(\text{flow rate} \times \frac{\text{vapor pressure of acid}}{\text{total pressure}}\right) \qquad (6)$$

From the foregoing formula it is apparent that increasing the total pressure of the gases flowing through the cathode gas space reduces acid loss. It is also a fact that increasing the total pressure results in a decrease in the vapor pressure of the acid due to dilution of the electrolyte, further reducing acid loss. Also due to the higher reactant pressures fuel cells incorporated in power plants of the present invention may be run at higher oxygen utilizations, and therefore the flow rate of air through the cathode gas space is lower and acid loss is further reduced. It has been determined that the foregoing factors combined reduce acid loss by an order of magnitude.

Figure 6:
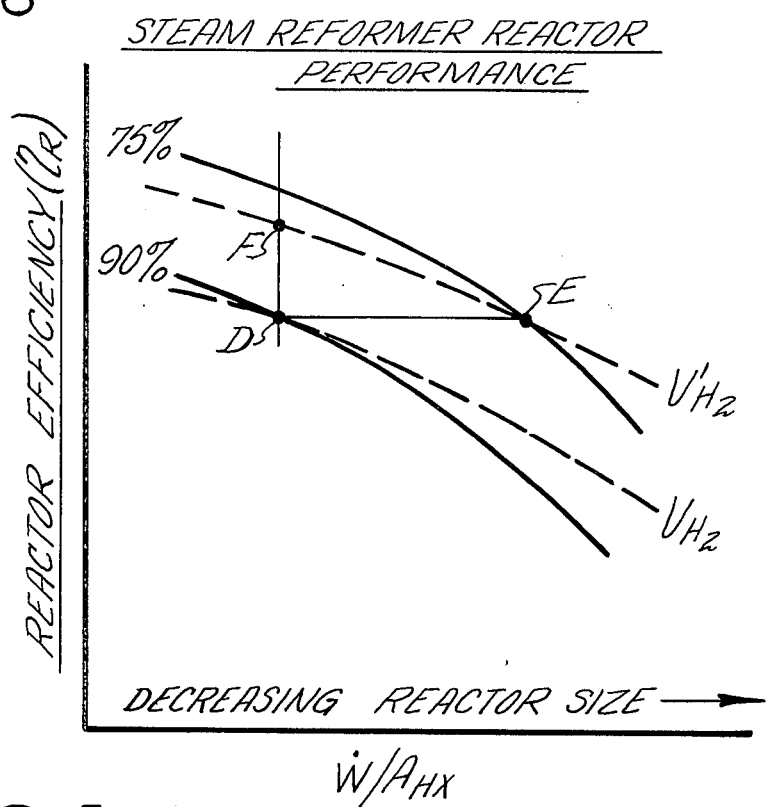
FIG. 6 is a graph illustrating the performance of steam reforming reactors used in power plants of the present invention.

A graph representative of a steam reformer reactor performance is shown in FIG. 6. Reformer efficiency ($\eta_R$) is plotted on the vertical axis and the flow rate of the processed gas stream ($\dot{W}$) divided by the heat transfer area of the reactor ($A_{hx}$) is plotted on the horizontal axis. Since the term $A_{hx}$ is directly related to the size of the reactor, reformer size decreases when moving to the right along the horizontal axis. Reformer efficiency is defined by the following equation:

$$\eta_R = (K) \, U_{H_2} \, (\alpha.\beta) \qquad (7)$$

where $K$ is a constant, $U_{H_2}$ is hydrogen utilization in the fuel cell, and the product $(\alpha.\beta)$ is fuel conversion in the reactor. Fuel conversion $(\alpha.\beta)$ is the percent of carbon in the incoming fuel which is converted to $CO_2$. It is representative of the amount of hydrogen produced in the steam reforming reaction. Shown in the graph of FIG. 6 are 90% and 75% fuel conversion curves along with a hydrogen utilization curve labeled $U_{H_2}$ and a hydrogen utilization curve labeled $U_{H_2}'$, the latter representing a higher hydrogen utilization. For the purposes of comparison assume that $U_{H_2}$ is the same hydrogen utilization as represented by the solid curves in FIG. 5 and that $U_{H_2}'$ is the hydrogen utilization represented by the dotted curves of FIG. 5. As discussed with reference to FIG. 5, fuel cells using reactants at atmospheric pressure were constrained to operate at a particular hydrogen utilization $U_{H_2}$ in order to achieve a certain cell voltage for a particular cell size (i.e., such as operating at point A). Having chosen a particular hydrogen utilization it is thus required that the operation of the steam reformer reactor must be somewhere along the hydrogen utilization curve $U_{H_2}$. It is thus a matter of choosing the best combination of reformer efficiency and reformer size for the particular cell. Generally, in order to keep reformer size within reasonable limits, fuel conversion in prior art reactors is commonly around 90%. This would put the operation of the steam reformer reactor used with prior art fuel cells at point D. It now becomes clear why it is so important to be able to run the fuel cell at a higher hydrogen utilization. For example, in a power plant designed according to the present invention it is now possible to operate along the curve $U_{H_2}'$. This permits the use of a smaller steam reformer reactor without sacrificing efficiency because the reformer can be run at a lower fuel conversion. This operating point is labeled E in FIG. 6. Of course, if desired, reactor size can be kept the same and reformer efficiency can be greatly improved such as by operating at point F. It is important to note that although there is some loss in fuel cell performance when operating at higher utilizations (see FIG. 5) the fuel cell performance picture is still greatly improved; and, in addition, significant improvements can also be realized in the steam reformer reactor. This is contrary to prior art power plants wherein although a higher reactant utilization in the fuel cell could result in benefits for the steam reformer reactor, these benefits are offset by the detrimental effect on fuel cell performance.

With regard to designing a power plant according to the present invention, it will, of course, be necessary to trade off between seeking improvements in reactor performance and seeking improvements in fuel cell performance. Thus, the reactant utilization, cell size, cell output voltage, reactor size, reactor efficiency, and reactor fuel conversion rate are chosen depending upon the particular goals of the power plant being designed.

In the preferred embodiment it is contemplated that naphtha will be used as the fuel and that the steam reforming reactor 34 will be of the well known type which utilizes a nickel catalyst. The reactor could, however, be any conventional apparatus for generating hydrogen. For example, although less efficient than a steam reformer reactor, a partial oxidation hydrogen generator may be used and will benefit significantly by the higher reactant gas pressures. In certain instances fuel conditioning apparatus may not even be required, such as if pure hydrogen is available for use as fuel for the stack.

With regard to power plants designed according to FIGS. 1 and 3 of the present invention, condensers considerably smaller than the condensers of prior art fuel cell power plants may be used. At a constant current there is a constant amount of water produced by the fuel cell according to Faraday's law. This water leaves the cell in the effluent gas streams. The steam reforming reaction is known to require a certain amount of water which, in the prior art, as in the embodiments shown in FIGS. 1 and 3 of the present invention, is obtained at least in part from the cathode gas stream. This water is removed from the cathode gas stream by a condenser. In prior art phosphoric acid electrolyte power plants wherein the gas stream is at atmospheric pressure the dew point of the stream is so low that in order to condense out a sufficient amount of water to run the steam reformer reaction the temperature of the gas stream leaving the condenser must necessarily be only a few degrees higher than the ambient cooling air. Accordingly, very large condensers are required. As heretofore stated the condensers are the largest components of prior art fuel cell power plants. In pressurized power plants according to the present invention the dew point of the gas stream leaving the cathode gas space will be considerably higher than in the prior art due to the higher pressure of the gas stream. For example, the dew point of a gas stream leaving a 300° F stack at 45 psia would be about 60° F higher than the dew point of a gas stream leaving a 300° F stack at atmospheric pressure. This means that to condense out the same amount of water the temperature of the gas stream need not be reduced to as low a level as in unpressurized systems. In other words there will be significant difference between the temperature of the condenser cooling air and the temperature of the gas stream leaving the condenser. Assuming the pressurized and unpressurized systems both use 90° F cooling air, it is estimated that the condenser size may be reduced by a factor of about two or three. This reduction in size of the condenser equipment is one of the major advantages of the present invention and helps to significantly reduce the cost of the power plant.

In the modified version or alternate embodiment described with respect to FIG. 1 the anode gas space effluent, after passing through the burner 36, is combined with the cathode gas space effluent at 102. This stream is very hot and includes a considerable amount of moisture. Of course from the point of view of the work required from the condenser 18, it is desirable that the temperature of the gas stream entering the condenser 18 be as close to the dew point as possible. As the anode effluent gas stream leaves the fuel conditioning apparatus 16 its temperature may be about 1240° F. It would be prohibitive, from the point of view of the condenser, to combine these extremely hot gases with the cathode gas stream effluent and pass them directly through the condenser. Thus these gases are first passed through the regenerator 101 where they are reduced in temperature to approximately 500° F. They are then combined with the gases from the cathode gas space 30. The combined gas streams enter the heat exchanger 22 whereupon they are further reduced in temperature. In order that the gas stream has sufficient energy to drive the turbine, after leaving the condenser the gas stream is boosted in temperature to about 600° F by flowing the stream back through the regenerators 22 and 101.

Refer now to FIG. 7 which is a graph of shift converter performance at constant gas stream temperature. Note that the embodiments of FIGS. 3 and 4 include a shift converter. The graph shows that there is a direct relationship between the performance of the shift converter and the pressure of the process gases flowing through the shift converter. Thus, when operating at higher gas pressures, there is an increase in catalyst activity which may be translated into a decrease in shift converter size or, in the alternative, more complete shifting for the same size shift converter. It can readily be seen that the shift catalyst activity doubles when the pressure of the gases flowing therethrough is increased from atmospheric pressure to about 60 psia. This improved shift converter performance is another advantage of being able to operate the fuel cell stack at high reactant gas pressures according to the present invention.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of my invention, that which I claim as new and desire to secure by Letters Patent of the United States is:

1. A power plant for generating electricity comprising:
- a fuel cell stack including a plurality of fuel cells connected electrically in series through a load, each cell comprising a cathode electrode, an anode electrode, an electrolyte disposed therebetween, a cathode gas space on the nonelectrolyte side of said cathode electrode and an anode gas space on the nonelectrolyte side of said anode electrode;
- compressor means including a compressor operably connected to turbine means;
- means for delivering air at a pressure of at least two atmospheres from said compressor into said cathode gas space;
- fuel conditioning apparatus including reactor means for producing hydrogen from a hydrogen containing fuel;
- burner means for providing heat to said reactor means;
- means for delivering pressurized hydrogen containing fuel into said reactor means;
- means for delivering pressurized hydrogen from said fuel conditioning apparatus into said anode gas space;
- means for delivering at least a first portion of said anode effluent gases into said burner means for providing fuel to said burner means; and
- means for delivering pressurized effluent gases from said cathode gas space and effluent gases from said burner means into said turbine means for powering said turbine means and driving said compressor.

2. The power plant according to claim 1 wherein said electrolyte is phosphoric acid.

3. The power plant according to claim 1 including a source of water and means for converting said water to pressurized steam, wherein said reactor means for producing hydrogen from a hydrogen containing fuel is a reactor means for producing hydrogen from a hydrogen containing fuel and steam, said power plant including means for delivering said pressurized steam into said reactor means.

4. The power plant according to claim 3 wherein said source of water includes said cathode effluent gases, said power plant including condenser means and means for delivering said cathode effluent gases into said condenser means for removing water therefrom, said power plant also including means for delivering the water condensed out of said cathode effluent gases to said means for converting said water to steam.

5. The power plant according to claim 4 wherein said condenser means is disposed upstream of said turbine means.

6. The power plant according to claim 4 wherein said source of water also includes said effluent gases from said burner means and said means for delivering said cathode effluent gases into said condenser means also includes means for delivering said effluent gases from said burner means into said condenser means upstream of said turbine.

7. The power plant according to claim 6 including means for combining said effluent gases from said burner means and said cathode effluent gases upstream of said condenser means.

8. The power plant according to claim 3 wherein said means for converting water to steam includes means to exchange heat produced in said stack with said water from said condenser means.

9. The power plant according to claim 1 wherein said reactor means is a steam reforming reactor and said burner means is a reactor burner.

10. The power plant according to claim 5 including regenerative heat exchanger means disposed downstream of said cathode gas space from reducing the temperature of said burner means effluent gases and cathode effluent gases before they enter said condenser means and for reheating said gases after they leave said condenser means.

11. The power plant according to claim 1 including means for delivering a second portion of said anode effluent gases into said reactor means, said second portion including steam.

12. The power plant according to claim 11 including heat removal means, and wherein said means for delivering pressurized hydrogen from said fuel conditioning apparatus into said anode gas space includes means for first delivering said hydrogen into said heat removing means for reducing the temperature of said gases to less than the temperature of said stack.

13. The power plant according to claim 1 wherein said fuel conditioning apparatus includes a shift converter disposed downstream of said reactor means.

14. The power plant according to claim 13 wherein said fuel conditioning apparatus includes a selective oxidizer disposed downstream of said shift converter and wherein said means for delivering air from said compressor into said cathode gas space includes means for delivering air from said compressor into said selective oxidizer and from said compressor into said burner means.

15. The power plant according to claim 1 wherein said means for delivering air from said compressor into said cathode gas space includes means for delivering air from said compressor into said burner means.

16. A power plant for generating electricity comprising:
a fuel cell stack including a plurality of fuel cells connected electrically in series through a load, each cell comprising a cathode electrode, an anode electrode, an electrolyte disposed therebetween, a cathode gas space on the nonelectrolyte side of said cathode electrode and an anode gas space on the nonelectrolyte side of said anode electrode;
a compressor for compressing air to greater than two atmospheres pressure;
turbine means operably connected to said compressor for driving said compressor;
means for delivering air at a pressure of at least two atmospheres from said compressor into said cathode gas space;
a steam reforming reactor for producing hydrogen;
reactor burner means for providing heat to said steam reforming reactor;
means for delivering pressurized hydrogen containing fuel into said steam reforming reactor;
means for delivering pressurized hydrogen from said steam reforming reactor into said anode gas space;
means for delivering steam into said steam reforming reactor comprising means for delivering a first portion of the anode effluent gases into said steam reforming reactor said anode effluent gases including sufficient steam for said reactor;
means for delivering compressed air from said compressor into said reactor burner;
means for delivering a second portion of the anode effluent gases into said reactor burner for burning unburned fuel therein; and
means for delivering cathode effluent gases and reactor burner effluent gases into said turbine means for driving said compressor.

17. The power plant according to claim 16 including heat removal means, wherein said means for delivering fuel from said steam reforming reactor into said anode gas space includes means for first delivering said fuel into said heat removal means for reducing the temperature thereof to less than the temperature of said stack.

18. A power plant for generating electricity comprising:
a fuel cell stack including a plurality of fuel cells connected electrically in series through a load, each cell comprising a cathode electrode, an anode electrode, an electrolyte disposed therebetween, a cathode gas space on the nonelectrolyte side of said cathode electrode and an anode gas space on the nonelectrolyte side of said anode electrode;
a compressor for compressing air to greater than two atmospheres pressure;
turbine means operably connected to said compressor for driving said compressor;
means for delivering air at a pressure of at least two atmospheres from said compressor into said cathode gas space;
a steam reforming reactor for producing hydrogen;
reactor burner means for providing heat to said reactor;
means for delivering pressurized hydrogen containing fuel into said steam reforming reactor;

means for delivering pressurized hydrogen from said steam reforming reactor into said anode gas space;

means for delivering anode effluent gases into said reactor burner for burning unburned fuel in said gases;

means for delivering compressed air from said compressor into said reactor burner; and means for combining the cathode effluent gases and the reactor burner effluent gases and for delivering said combined gases into said turbine means for driving said compressor.

19. The power plant according to claim 18 including condenser means and boiler means, wherein said means for delivering said combined gases into said turbine means includes means for first delivering said combined gases into said condenser means for removing water therefrom, said power plant also including means for delivering said water from said condenser means into said boiler means for converting said water to steam and means for delivering said steam from said boiler means into said steam reforming reactor.

20. In the process for generating electricity in a power plant comprising fuel conditioning apparatus including reactor means, a compressor operably connected to turbine means, and a fuel cell stack including a plurality of fuel cells connected electrically in series through a load, each cell comprising a cathode electrode, an anode electrode, an electrolyte disposed therebetween, a cathode gas space on the nonelectrolyte side of said cathode electrode, and an anode gas space on the nonelectrolyte side of said anode electrode, the steps of:

compressing air to greater than two atmospheres in said compressor;

delivering said compressed air at greater than two atmospheres from said compressor into said cathode gas space;

delivering pressurized hydrogen containing fuel into said reactor means;

producing hydrogen in said reactor means;

delivering pressurized hydrogen from said fuel conditioning apparatus into said anode gas space;

providing heat for said step of producing hydrogen by burning at least a first portion of the anode effluent gases in a burner; and driving said compressor by delivering cathode effluent gases and effluent gases from said burner.

21. The process according to claim 20 including the step of delivering steam into said reactor means.

22. The process according to claim 21 wherein said step of delivering steam into said reactor means includes delivering a second portion of said anode effluent gases into said reactor means, said second portion including steam.

23. The process according to claim 20 including the step of condensing water out of said cathode effluent gases prior to the step of delivering said gases into said turbine means, converting said condensed out water to steam, and delivering said steam into said reactor means.

24. The process according to claim 20 including the steps of combining said cathode effluent gases and the effluent gases from said burner prior to delivering said gases into said turbine means, condensing water from said combined gases prior to delivering said gases into said turbine means, converting said condensed out water to steam, and delivering said steam into said reactor means.

25. The process according to claim 22 wherein said step of delivering hydrogen into said anode gas space includes the step of first removing sufficient heat from said hydrogen to reduce its temperature to less than the desired temperature of said stack.

26. The process according to claim 20 including the steps of condensing water out of said cathode effluent gases and out of said burner effluent gases prior to delivering said gases into said turbine means, converting said condensed out water to steam, and delivering said steam into said reactor means.

27. The process according to claim 21 wherein said step of producing hydrogen includes steam reforming said hydrogen containing fuel.

28. The process according to claim 20 wherein said step of burning anode effluent gases includes the step of burning said gases in the presence of compressed air delivered from said compressor into said burner.

29. The process according to claim 23 including reducing the temperature of said cathode effluent gases in a regenerative heat exchanger prior to said step of condensing water therefrom, and reheating said cathode effluent gases in said regenerative heat exchanger after said step of condensing water therefrom.

30. The process according to claim 24 including reducing the temperature of said combined gases in a regenerative heat exchanger prior to said step of condensing water therefrom, and reheating said combined gases in said regenerative heat exchanger after said step of condensing water therefrom.

* * * * *

UNITED STATES PATENT OFFICE
CERTIFICATE OF CORRECTION

PATENT NO. : 4,004,947
DATED : Jan. 25, 1977
INVENTOR(S) : David P. Bloomfield

It is certified that error appears in the above-identified patent and that said Letters Patent are hereby corrected as shown below:

Column 2, line 9, before "The" insert -- " --.

Column 6, line 14, after "No. 58" insert -- -GTP-16 --.

Column 11, line 5, "atmosphere" should read --atmospheric--.

Column 12, lines 17, 21, and 41, "$U_{H_2}'$" should read -- $U'_{H_2}$ --.

Claim 20, column 17, line 47, after "burner" insert --into said turbine means--.

Signed and Sealed this

Tenth Day of May 1977

[SEAL]

Attest:

RUTH C. MASON
Attesting Officer

C. MARSHALL DANN
Commissioner of Patents and Trademarks